(12) United States Patent (10) Patent No.: US 9,172,727 B2
Chang et al. (45) Date of Patent: Oct. 27, 2015

(54) CUSTOMER PREMISE EQUIPMENT AND MICROPROCESSOR RESOURCE MANAGEMENT METHOD OF CUSTOMER PREMISE EQUIPMENT

(71) Applicant: HON HAI PRECISION INDUSTRY CO., LTD., New Taipei (TW)

(72) Inventors: Chi-Hao Chang, New Taipei (TW); Li-Jen Hsu, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 118 days.

(21) Appl. No.: 13/965,227

(22) Filed: Aug. 13, 2013

(65) Prior Publication Data

US 2014/0056241 A1 Feb. 27, 2014

(30) Foreign Application Priority Data

Aug. 27, 2012 (TW) .............................. 101131073 A

(51) Int. Cl.
*H04W 4/00* (2009.01)
*H04L 29/06* (2006.01)
(52) U.S. Cl.
CPC ........ *H04L 65/1069* (2013.01); *H04L 65/1059* (2013.01)

(58) Field of Classification Search
None
See application file for complete search history.

(56) References Cited

U.S. PATENT DOCUMENTS

| 2002/0188732 | A1* | 12/2002 | Buckman et al. | 709/228 |
| 2004/0022237 | A1 | 2/2004 | Elliott et al. | |
| 2009/0138961 | A1 | 5/2009 | Lin et al. | |
| 2011/0247004 | A1* | 10/2011 | Matsukawa | 718/104 |
| 2012/0195223 | A1 | 8/2012 | Raleigh | |
| 2013/0128824 | A1* | 5/2013 | Rothschild | 370/329 |

\* cited by examiner

*Primary Examiner* — Kibrom T Hailu
(74) *Attorney, Agent, or Firm* — Novak Druce Connolly Bove + Quigg LLP

(57) ABSTRACT

A customer premise equipment (CPE) with the ability to manage its own resources. When a communication device request establishment of a voice communication with an external terminal. A usage rate of a microprocessor of the CPE is detected, and the usage rate of the microprocessor is determined and classified as being between a number of usage levels. When the usage rate of the microprocessor is in a high level, two virtual channels are created, to divide a network bandwidth of the CPE. One of the virtual channels is used for packets of voice communication, and the other virtual channel is used for transmission of other kinds of data packages.

12 Claims, 3 Drawing Sheets

CUSTOMER PREMISE EQUIPMENT AND MICROPROCESSOR RESOURCE MANAGEMENT METHOD OF CUSTOMER PREMISE EQUIPMENT

BACKGROUND

1. Technical Field

Embodiments of the present disclosure relate to processor resources management technologies, and particularly to a method for managing microprocessor resources of a customer premise equipment (CPE).

2. Description of Related Art

Customer premise equipment (CPE), such as gateways and routers, are used for interconnection between communication terminals (e.g., computers and smart phones) and a network. When a communication terminal is connected to the network via the CPE, it can establish voice communications with other communication terminals. In order to save hardware cost, a digital signal processing (DSP) chip for processing voice data streaming is replaced by DSP software. Since the DSP software shares microprocessor resources of the CPE with other applications of the CPE, the DSP software may not be allocated sufficient microprocessor resources to process voice data streaming of a voice communication when the CPE is executing other tasks (e.g., executing an FTP downloading task), which may decrease quality of the voice communication. Therefore, there is room for improvement in the art.

DETAILED DESCRIPTION

The disclosure, including the accompanying drawings, is illustrated by way of example and not by way of limitation. It should be noted that references to "an" or "one" embodiment in this disclosure are not necessarily to the same embodiment, and such references mean "at least one."

Figure 1:
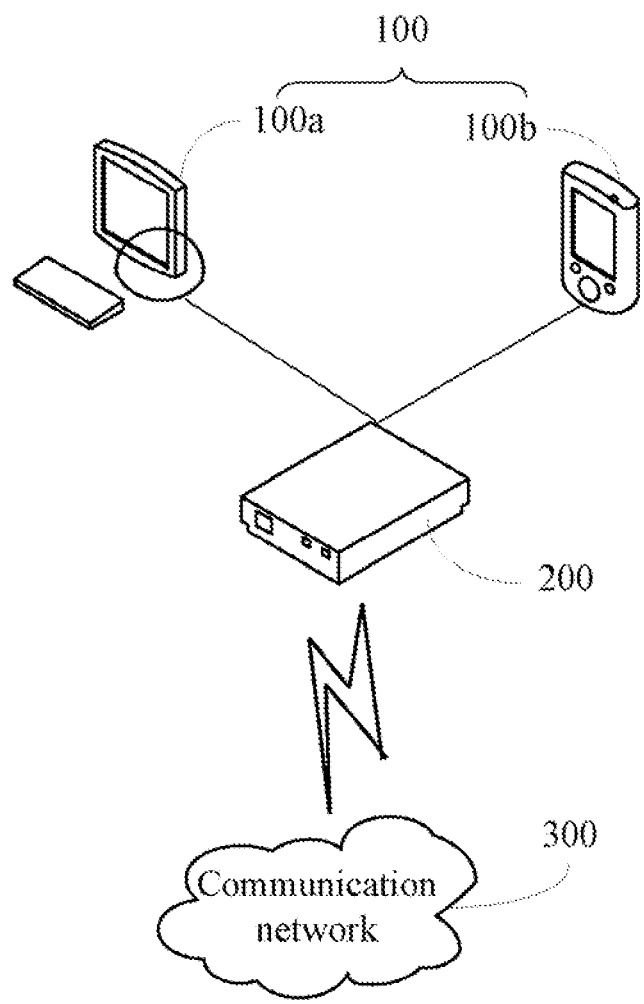
FIG. 1 is a schematic diagram illustrating a customer premise equipment (CPE) that is used to establish connections between one or more communication devices and a network.

FIG. 1 is a schematic diagram illustrating a customer premise equipment (CPE) 200 that is used to establish a connection between a communication device 100 (e.g., a computer 100a or a mobile phone 100b) and a communication network 300. When the communication device 100 is connected to the communication network 300, the communication device 100 can request the establishment of the voice communication with other communication devices via the communication network 300.

In the embodiment, the voice communication is established based on a voice over Internet protocol (VoIP). The communication network 300 may be, for example, a world interoperability for microwave access (WIMAX) network, a second generation (2G) network, or a third generation (3G) network. The CPE 200 is a gateway or a router, which is connected to the communication device 100 via a wired connection (e.g., a data line) or a wireless connection (e.g., BLUETOOTH® OR WIFI®).

Figure 2:
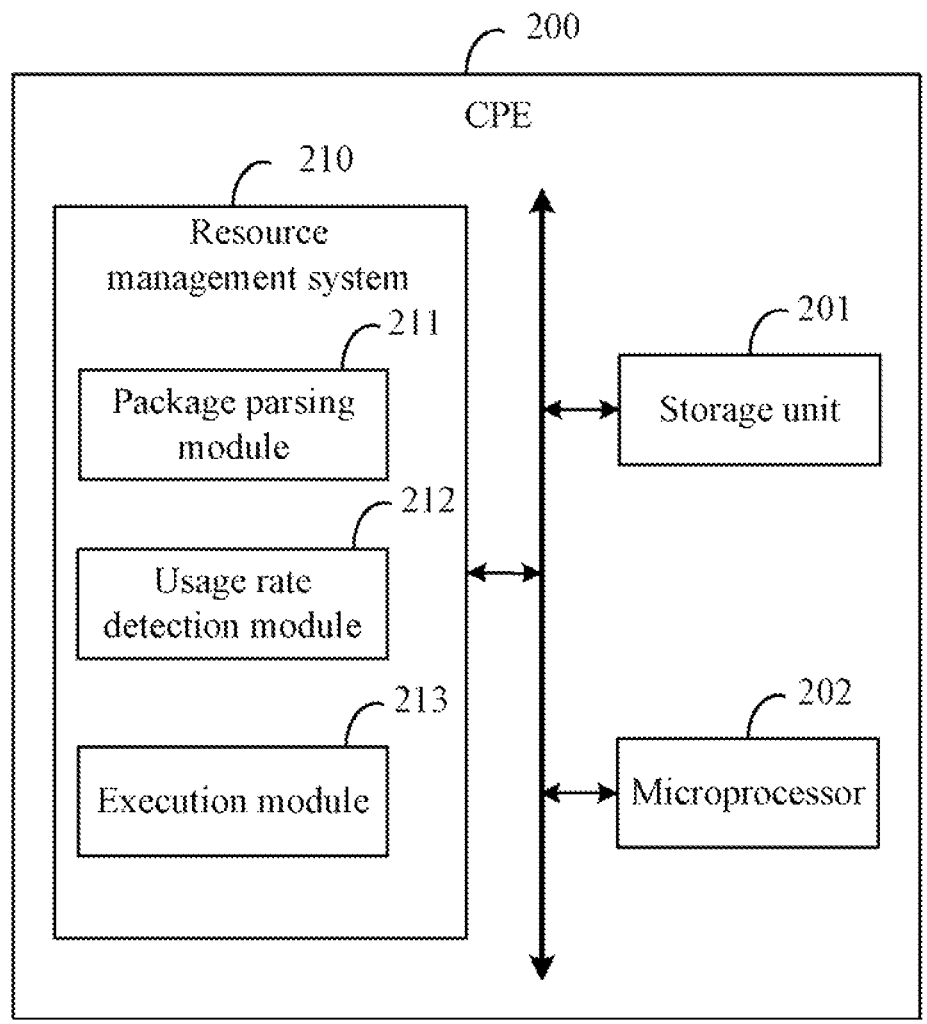
FIG. 2 is a schematic block diagram of the CPE of FIG. 1.

FIG. 2 is a schematic block diagram of the CPE 200 of FIG. 1. The CPE 200 includes a storage unit 201, a microprocessor 202, and a resource management system 210 including a plurality of functional modules. Each of the functional modules may include a plurality of programs in the form of one or more computerized instructions stored in the storage unit 201 or other storage medium and executed by the microprocessor 202 to perform operations of the CPE 200. In the embodiment, the resource management system 210 includes a package parsing module 211, a usage rate detection module 212, and an execution module 213.

In general, the word "module", as used herein, refers to logic embodied in hardware or firmware, or to a collection of software instructions, written in a programming language, such as, Java, C, or assembly. One or more software instructions in the modules may be embedded in firmware, such as in an erasable programmable read only memory (EPROM). The modules described herein may be implemented as either software and/or hardware modules and may be stored in any type of non-transitory computer-readable medium or other storage devices. Some non-limiting examples of non-transitory computer-readable medium include CDs, DVDs, BLU-RAY, flash memory, and hard disk drives.

The package parsing module 211 parses each data package received by the CPE 200 to determine whether or not the data package requests establishment of a voice communication between the communication device 100 and an external terminal. In the embodiment, the word "data package" is defined to be a coherent collection of various kinds of data and possibly other assets in a single "package". When a data package is received and detected, the package parsing module 211 determines whether or not the data package is an invitation package based on a session initiation protocol (SIP). If the data package is an invitation package, the package parsing module 211 determines that the data package does request the establishment of the voice communication. Otherwise, if the data package is not an invitation package, the package parsing module 211 determines that the data package does not request the establishment of the voice communication. In one embodiment, the invitation package may be sent from the communication device 100 or sent from the external terminal via the communication network 300. The invitation package is defined to be a data package having a particular format based the SIP which is used to request the establishment of the voice communication device.

The usage rate detection module 212 detects a usage rate U of the microprocessor 202 of the CPE 200 when a data package does request the establishment of the voice communication, and compares the usage rate U with a first predetermined threshold value M (e.g., 50%) and a second predetermined threshold value H (e.g., 80%), where the first predetermined threshold value M is greater than the second predetermined threshold value H. The first predetermined threshold value M and the second predetermined threshold value H are two levels (e.g., a middle level and a high level) of usage rate of the microprocessor 202.

The execution module 213 establishes the voice communication in different ways according to the comparison of the usage rate U and the first predetermined threshold value M and the second predetermined threshold value H. The different ways to establish the voice communication are described as follows.

If the usage rate U is less than the first predetermined threshold value M (U<M), the usage rate of the microprocessor 202 is regarded as a low level and there are deemed to be sufficient microprocessor resources for the CPE 200 to process voice data streaming of the voice. Under this situation, the execution module 213 directly establishes the voice communication between the communication device 100 and the external terminal via the communication network 300.

If the usage rate U is greater than or equal to the first predetermined threshold value M but less than the second predetermined threshold value H (M≤U<H), the usage rate of the microprocessor 202 is regarded as middle level and there may be no sufficient microprocessor resources for the CPE 200 to process voice data streaming of the voice communication. Under this situation, the execution module 213 creates a first virtual channel and a second virtual channel, allocates a first network bandwidth for the first virtual channel to establish the voice communication and carry the voice communication packages between the communication device 100 and an external terminal, and allocates a second network bandwidth for the second virtual channel to transmit other kinds of data packages (e.g., ftp packages and http packages) received by the CPE 200. The first and second virtual channels refer to two different software programs or functions which divide the network bandwidth of the CPE 200 into two or more portions to respectively transmit different kinds of data packages.

If the usage rate U is greater than or equal to the second predetermined threshold value H (U≥H), the usage rate of the microprocessor 202 is regarded as high level. Under this situation, the execution module 213 creates a third virtual channel and a fourth virtual channel, allocates a third network bandwidth for the third virtual channel to establish the voice communication and transmit the voice communication packages between the communication device 100 and the external terminal, and allocates a fourth network bandwidth for the fourth virtual channel to transmit other kinds of data packages received by the CPE 200.

In the embodiment, an amount of the first network bandwidth and the second network bandwidth and an amount of the third network bandwidth and the fourth network bandwidth both are equal to a total network bandwidth of the CPE 200. The first, second, third and fourth network bandwidths are predetermined by a user according to requirements. Each of the second and fourth network bandwidths can be set to an appropriate level to limit a number of non-voice data packages to flow into the CPE 200, thereby limiting microprocessor resources consumed by the non-voice data packages. Thus, the left microprocessor resources are utilized to be sufficient to transmit the voice data streaming of the voice communication, and the quality of the voice communication is improved. It should be understood that, when U≥H, non-voice data packages flowing into the CPE 200 need to be further limited. That is, the third network bandwidth is greater than the first network bandwidth, and the fourth network bandwidth is less than the second network bandwidth accordingly.

Additionally, if the execution module 213 cannot acquire sufficient microprocessor resources to process the voice communication using the third virtual channel upon condition that U≥H (e.g., when a plurality of voice communications are established by the CPE 200), the execution module 213 directly rejects the request for establishing the voice communication.

Figure 3:
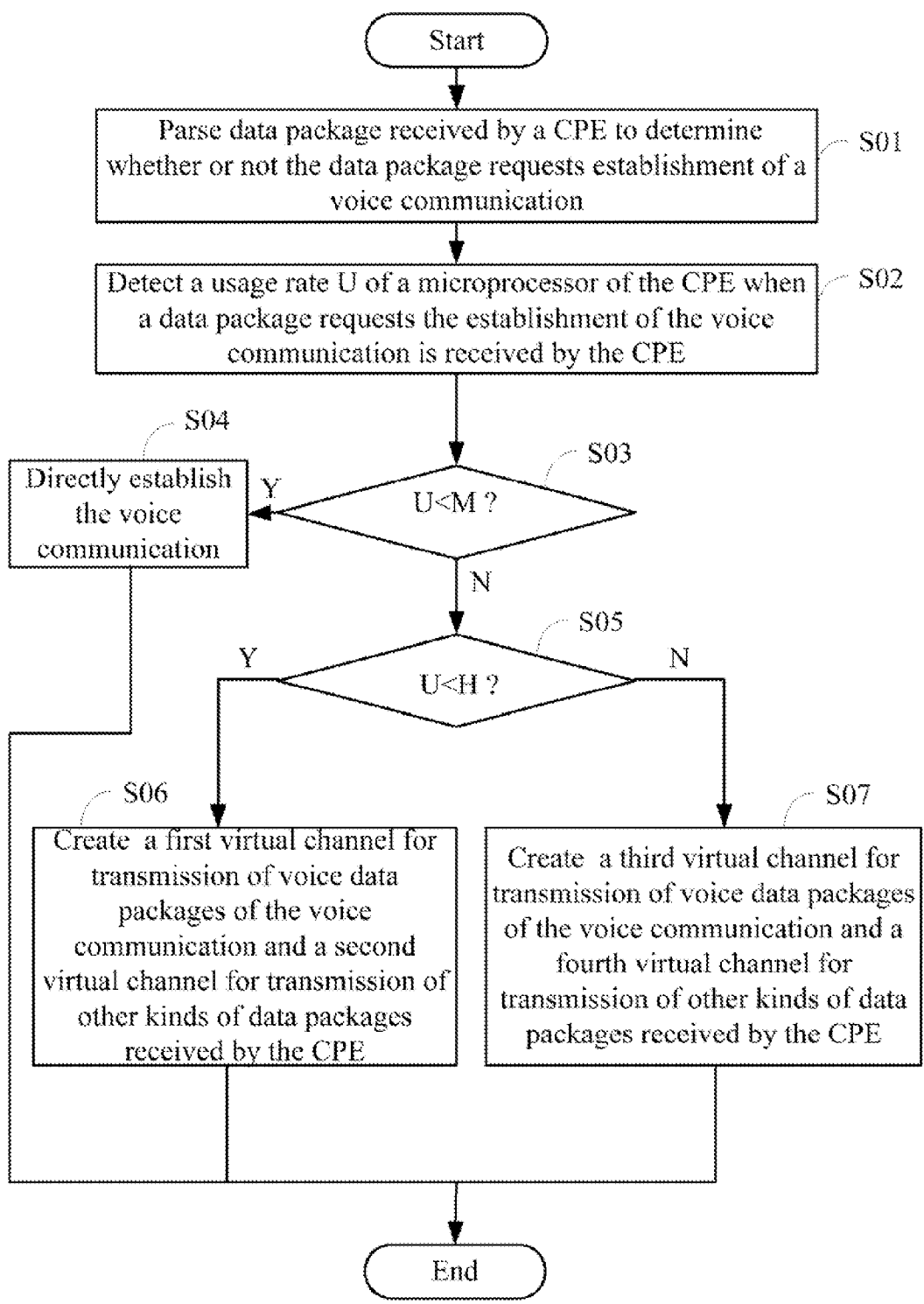
FIG. 3 is a flowchart of one embodiment of a microprocessor resources management method of the CPE of FIG. 1.

FIG. 3 is a flowchart of one embodiment of a microprocessor resources management method of the CPE 200 of FIG. 1. Depending on the embodiment, additional steps may be added, others removed, and the ordering of the steps may be changed.

In step S01, each data package received by the CPE 200 is parsed by the package parsing module 21 to determine whether or not the CPE 200 receives a data package which requests the establishment of a voice communication between the communication device 100 and an external terminal In the embodiment, the package parsing module 211 determines whether or not the CPE 200 receives a data package which requests the establishment of the voice communication by determining whether or not the data package is an invitation package based on a session initiation protocol (SIP).

In step S02, when the CPE 200 receives a data package which requests the establishment of the voice communication, a usage rate U of the microprocessor 202 of the CPE 200 is detected using the usage rate detection module 212.

In step S03, whether or not the usage rate U is less than a first predetermined threshold value M is determined by the usage rate detection module 212. If the usage rate U is less than the first predetermined threshold value M (U<M), the procedure goes to step S04. Otherwise, if the usage rate U is greater than or equal to the first predetermined threshold value M (U≥H), the procedure goes to step S05.

In step S04, the voice communication between the communication device 100 and the external terminal is directly established by the execution module 213, and the procedure ends.

In step S05, whether or not the usage rate U is less than a second predetermined threshold value H is determined by the usage rate detection module 212. If the usage rate U is less than the second predetermined threshold value H (M≤U<H), the procedure goes to step S06. Otherwise, if the usage rate U is greater than or equal to the second predetermined threshold value H (U≥H), the procedure goes to step S07.

In step S06, the execution module 213 creates a first virtual channel and a second virtual channel, allocates a first network bandwidth for the first virtual channel to establish the voice communication and to transmit voice data packages of the voice communication, and allocates a second network bandwidth for the second virtual channel to transmit other kinds of data packages received by the CPE 200, and the procedure ends.

In step S07, the execution module 213 creates a third virtual channel and a fourth virtual channel, allocates a third network bandwidth for the third virtual channel to establish the voice communication and to transmit voice data packages of the voice communication, and allocates a fourth network bandwidth for the fourth virtual channel to transmit other kinds of data packages received by the CPE 200.

Although certain embodiments of the present disclosure have been specifically described, the present disclosure is not to be construed as being limited thereto. Various changes or modifications may be made to the present disclosure without departing from the scope and spirit of the present disclosure.

What is claimed is:

1. A computerized microprocessor resource management method of a customer premise equipment (CPE) which connects a communication device to a communication network, the CPE comprises a microprocessor to execute the method, the method comprising:

parsing a data package received by the CPE to determine whether or not the data package requests establishment of a voice communication between the communication device and an external terminal;

detecting a usage rate of the microprocessor when a data package requests the establishment of the voice communication is received by the CPE;

comparing the usage rate with a first predetermined threshold value;

allocating a first network bandwidth for a first virtual channel to establish the voice communication and to carry voice communication packages between the communication device and the external device, and allocating a second network bandwidth for a second virtual channel to transmit other kinds of data packages received by the CPE, when the usage rate is greater than or equal to the first predetermined threshold value. and comparing the usage rate with a second predetermined threshold value when the usage rate is greater than or equal to the first predetermined threshold value, where the first predetermined threshold value is less than the second predetermined threshold value; and in response to the usage rate being greater than or equal to the second predetermined threshold value, allocating a third network bandwidth for a third virtual channel to establish the voice communication and to carry the voice communication packages between the communication device and the external device, and allocating a fourth network bandwidth for a fourth virtual channel to transmit other kinds of data packages received by the CPE, where the third network bandwidth is greater than the first network bandwidth, and the fourth network bandwidth is less than the second network bandwidth.

2. The method according to claim 1, wherein both an amount of the first network bandwidth and the second network bandwidth and an amount of the third network bandwidth and the fourth network bandwidth are equal to a total network bandwidth of the CPE.

3. The method according to claim 1, further comprising: directly establishing the voice communication between the communication device and the external terminal via the communication network when the usage rate of the microprocessor is less than the first predetermined threshold value.

4. The method according to claim 1, wherein whether or not the data package requests the establishment of the voice communication is determined by determining whether or not each data package is an invitation package based on a session initiation protocol (SIP).

5. The method according to claim 1, wherein the CPE is a gateway or a router, which is connected to the communication device via a wired connection or a wireless connection.

6. The method according to claim 1, wherein the communication network is a world interoperability for microwave access (WIMAX) network, a second generation (2G) network, or a third generation (3G) network.

7. A customer premise equipment (CPE) which connects a communication device to a communication network, comprising:

a microprocessor;

one or more programs executed by the microprocessor to perform a method of:

parsing a data package received by the CPE to determine whether or not the data package requests establishment of a voice communication between the communication device and an external terminal;

detecting a usage rate of the microprocessor when a data package requests establishment of the voice communication is received by the CPE;

comparing the usage rate with a first predetermined threshold value;

allocating a first network bandwidth for a first virtual channel to establish the voice communication and to carry voice communication packages between the communication device and the external device, and allocating a second network bandwidth for a second virtual channel to transmit other kinds of data packages received by the CPE, when the usage rate is greater than or equal to the first predetermined threshold value. and comparing the usage rate with a second predetermined threshold value when the usage rate is greater than or equal to the first predetermined threshold value, where the first predetermined threshold value is less than the second predetermined threshold value; and creating a third virtual channel and a fourth virtual channel when the usage rate is greater than or equal to the second predetermined threshold value, allocating a third network bandwidth for the third virtual channel to establish the voice communication and to carry the voice communication packages between the communication device and the external device, and allocating a fourth network bandwidth for the fourth virtual channel to transmit other kinds of data packages received by the CPE, where the third network bandwidth is greater than the first network bandwidth, and the further network bandwidth is less than the second network bandwidth.

8. The CPE according to claim 7, wherein both an amount of the first network bandwidth and the second network bandwidth and an amount of the third network bandwidth and the fourth network bandwidth are equal to a total network bandwidth of the CPE.

9. The CPE according to claim 7, wherein the method further comprises: directly establishing the voice communication between the communication device and the external terminal via the communication network when the usage rate of the microprocessor is less than the first predetermined threshold value.

10. The CPE according to claim 7, wherein whether or not the data package requests the establishment of the voice communication is determined by determining whether or not each data package is an invitation package based on a session initiation protocol (SIP).

11. The CPE according to claim 7, wherein the CPE is a gateway or a router, which is connected to the communication device via a wired connection or a wireless connection.

12. The CPE according to claim 7, wherein the communication network is a world interoperability for microwave access (WIMAX) network, a second generation (2G) network, or a third generation (3G) network.

* * * * *